United States Patent
Morille et al.

(10) Patent No.: US 10,054,416 B2
(45) Date of Patent: Aug. 21, 2018

(54) METHOD FOR CONTROLLING AN OFFSET BETWEEN TWO STOPS AND TOOL FOR CONTROLLING AN OFFSET BETWEEN TWO STOPS

(71) Applicant: Airbus Operations S.A.S., Toulouse (FR)

(72) Inventors: Dominique Morille, Montoir de Bretagne (FR); Maxime Massonnet, Montrouge (FR)

(73) Assignee: Airbus Operations S.A.S. (FR)

( * ) Notice: Subject to any disclaimer, the term of this patent is extended or adjusted under 35 U.S.C. 154(b) by 169 days.

(21) Appl. No.: 15/288,278

(22) Filed: Oct. 7, 2016

(65) Prior Publication Data
US 2017/0102220 A1 Apr. 13, 2017

(30) Foreign Application Priority Data
Oct. 13, 2015 (FR) ...................... 15 59696

(51) Int. Cl.
*G01B 3/20* (2006.01)
(52) U.S. Cl.
CPC ..................... *G01B 3/20* (2013.01)
(58) Field of Classification Search
CPC ....................................................... G01B 3/20
USPC .......................................... 33/194, 613, 645
See application file for complete search history.

(56) References Cited

U.S. PATENT DOCUMENTS

| 4,285,132 | A | | 8/1981 | Kloster | |
|---|---|---|---|---|---|
| 4,388,761 | A | * | 6/1983 | Henderson | B43L 13/028 33/42 |
| 4,989,332 | A | * | 2/1991 | Worrallo | B43L 7/005 33/342 |
| 5,235,988 | A | | 8/1993 | Johnson et al. | |
| 5,465,498 | A | | 11/1995 | Lycan | |
| 5,551,162 | A | * | 9/1996 | Struble | G01B 5/14 33/544.4 |
| 6,260,283 | B1 | * | 7/2001 | Abernathy | B43L 7/12 33/419 |
| 6,662,456 | B1 | * | 12/2003 | Triplett | G01B 3/22 33/203 |
| 7,000,331 | B2 | * | 2/2006 | Kennedy | G01B 3/22 33/626 |
| 7,171,760 | B1 | * | 2/2007 | Lemon | B23D 59/002 33/628 |
| 7,584,550 | B2 | * | 9/2009 | Campbell | G01B 5/061 33/533 |
| 2015/0268038 | A1 | * | 9/2015 | Thorndike | G01B 11/30 33/228 |

OTHER PUBLICATIONS

FR 15 59696 Search Report dated Jun. 22, 2016.

* cited by examiner

*Primary Examiner* — G. Bradley Bennett
(74) *Attorney, Agent, or Firm* — Lerner, David, Littenberg, Krumholz & Mentlik, LLP

(57) ABSTRACT

A tool for controlling an offset between two stops, includes: a body which includes an extension with an end configured to abut against one of the stops, a sliding rule that is configured to slide in a longitudinal direction in relation to the body and which has an end configured to bear against the other stop, the sliding rule being shifted in a transversal direction in relation to the extension, and a system configured to control the displacement of the sliding rule in relation to the body.

7 Claims, 2 Drawing Sheets

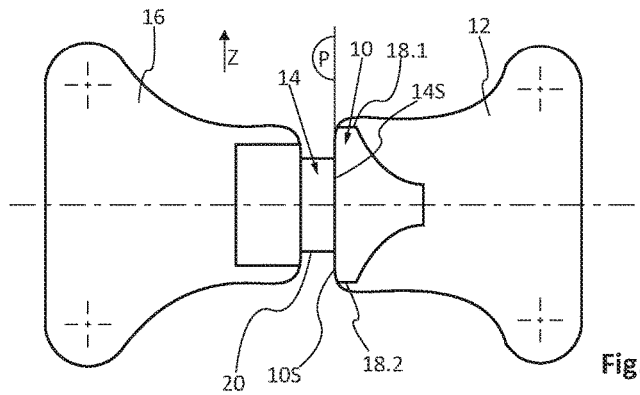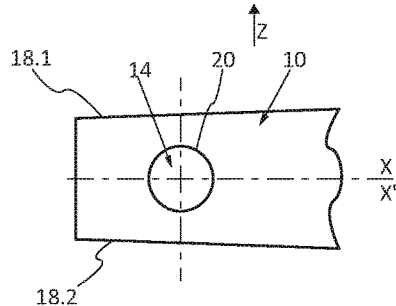
Fig. 1A  Fig. 1B
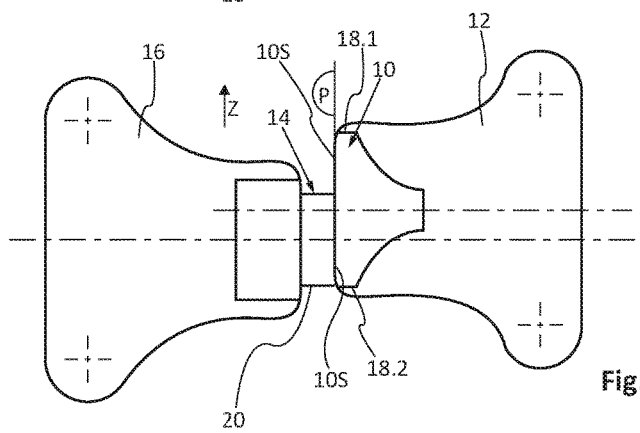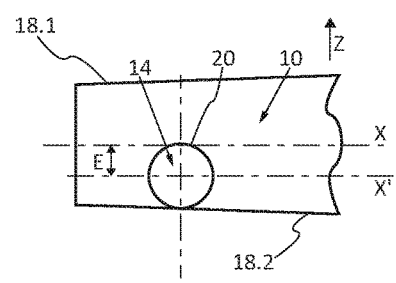
Fig. 2A  Fig. 2B
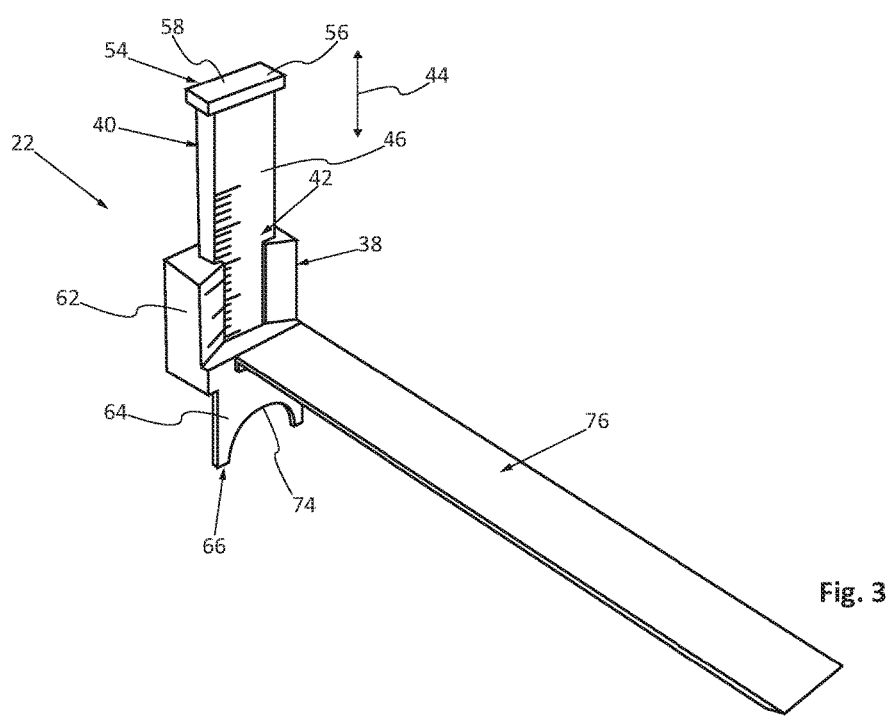
Fig. 3

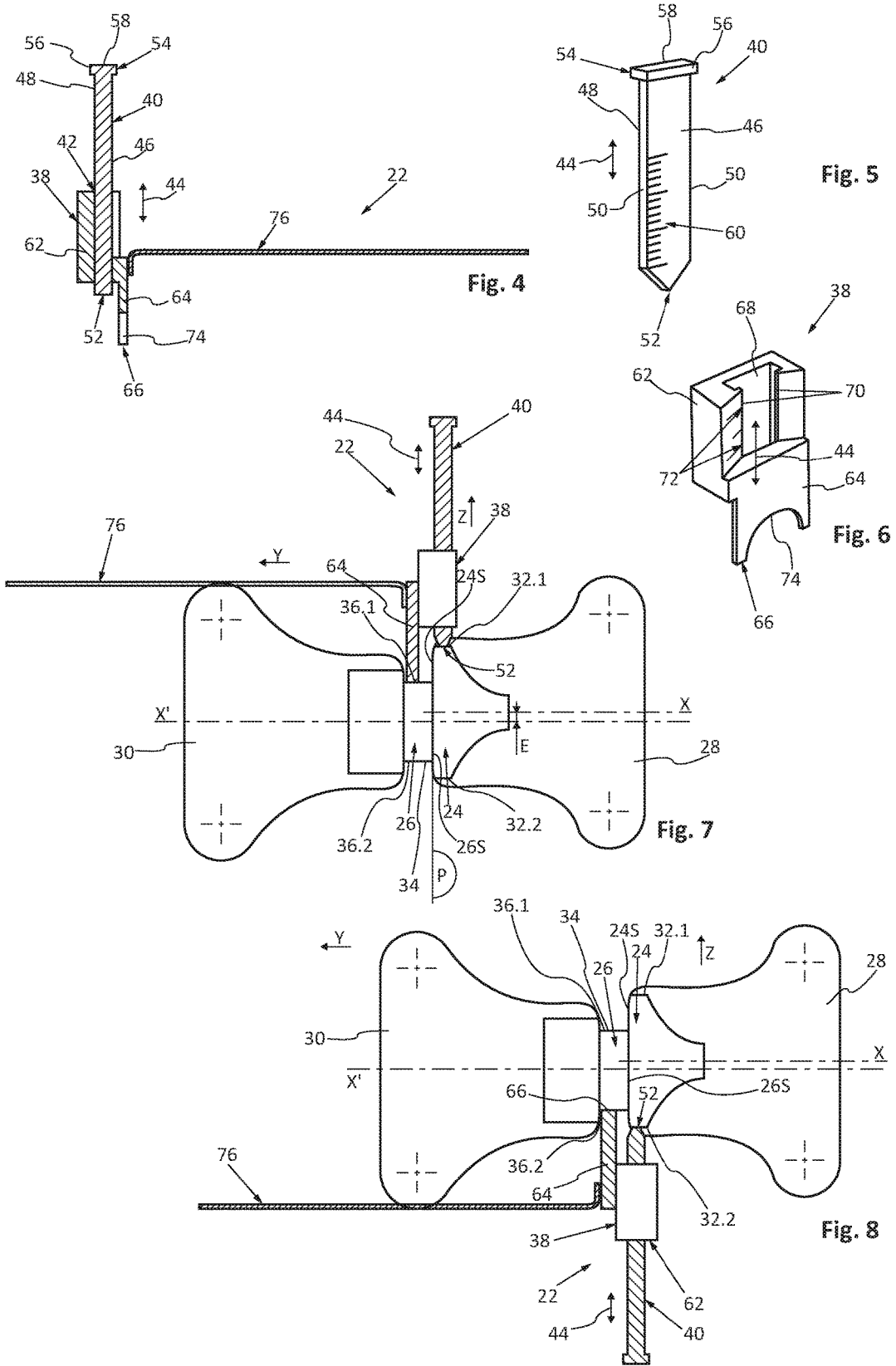

METHOD FOR CONTROLLING AN OFFSET BETWEEN TWO STOPS AND TOOL FOR CONTROLLING AN OFFSET BETWEEN TWO STOPS

FIELD OF THE INVENTION

The present invention relates to a method for controlling an offset between two stops and a tool for controlling an offset between two stops.

BACKGROUND OF THE INVENTION

FIGS. 1A, 1B, 2A and 2B represent a first stop 10 integral with a first support 12 connected to a frame and a second stop 14 integral with a second support 16 connected to a door hinged relative to the frame.

The first stop 10 and the second stop 14 have a first contact surface 10S and a second contact surface 14S, respectively, these contact surfaces 10S and 14S being configured to be in contact against one other when the door is in the closed position.

The first and second contact surfaces 10S and 14S are substantially planar and their contact plane is hereinafter referred to as the reference plane P.

According to one configuration, the first contact surface 10S has an elongated shape delimited by a first edge 18.1 and second edge 18.2. The first and second edges 18.1 and 18.2 are symmetrical in relation to a first central axis X.

For the remainder of the description, a Z-direction of offset corresponds to a direction perpendicular to the first central axis X and contained in the reference plane P.

According to embodiment configuration, the second stop 14 is a cylindrical pellet which comprises a cylindrical periphery 20. The second contact surface 14S is disc-shaped and comprises a second central X' axis parallel to the first central axis X.

Optimally, the second surface contact 14S must be positioned centrally relative to the first surface 10S, as illustrated in FIGS. 1A and 1B. Thus, the first and second central X and X' axes coincide.

However, as illustrated in FIGS. 2A and 2B, the first and second contact surfaces 10S and 14S are generally offset in the Z-direction of offset, the first and second central axes X and X' being separated by a so-called offset distance E.

This offset E must be less than or equal to +/−1 mm in the case of an aircraft door stop.

Controlling this offset E is not easy because the space around the first and second stops 10 and 12 is confined, the door being in the closed position during the control.

According to the prior art, there is no tool enabling a simple, reliable and practical control of the offset.

BRIEF SUMMARY OF THE INVENTION

The present invention seeks to address this shortfall.

For this purpose, the invention relates to a tool for controlling an offset between two stops, wherein the tool comprises a body, a sliding rule and a system for controlling a displacement of the sliding rule in relation to the body, the sliding rule comprising an end configured to abut against a first stop of the two stops, the body comprising a guide configured to allow the sliding rule to slide in a longitudinal direction and an extension that includes an end configured to abut against a second stop of the two stops, the guide and the extension being offset in relation to one another in a transversal direction perpendicular to the longitudinal direction.

This tool makes it possible to simply and efficiently control if the offset is less than or equal to a tolerance value.

Advantageously, the end of the extension has a shape configured to cooperate with a shape of the second stop. According to an embodiment, the end of the extension comprises a circular arc-shaped notch with a diameter equal to the diameter of the second stop in the shape of a cylindrical pellet.

Preferably, the end of the sliding rule is pointed in shape.

According to another feature, the control system is configured to measure the displacement of the sliding rule relative to the body. According to an embodiment, the control system comprises graduations on the sliding rule and at least one mark on the body, configured to cooperate with the graduations of the sliding rule.

According to another feature, the tool comprises a handle connected to the body.

The invention also relates to a method for controlling an offset between a first stop and a second stop, the first stop comprising a first contact surface delimited according to a direction of offset by a first edge and by a second edge, the second stop comprising a second contact surface delimited in the direction of offset by a first edge and by a second edge.

The method is characterized in that it comprises of the following steps:

determination of a deviation between a first distance in the direction of offset, in a first position, between the first edge of the first stop and the first edge of the second stop and a second distance in the direction of offset, in a second position diametrically opposite to the first position, between the second edge of the first stop and the second edge of the second stop, and controlling that the deviation is less than or equal to twice a tolerance value.

The invention also relates to a method for measuring an offset between a first stop and a second stop, the first stop comprising a first contact surface delimited according to a direction of offset by a first edge and by a second edge, the second stop comprising a second contact surface delimited in the direction of offset by a first edge and by a second edge.

The method is characterized in that it comprises of the following steps:

performing a first measurement in the direction of offset, in a first position, between the first edge of the first stop and the first edge of the second stop, performing a second measurement in the direction of offset, in a second position diametrically opposite to the first position, between the second edge of the first stop and the second edge of the second stop, determination of an offset value that is equal to half the difference between the first measurement and the second measurement.

BRIEF DESCRIPTION OF THE DRAWINGS

Other features and advantages will become apparent from the following description of the invention, given by way of example only, with reference to the accompanying drawings in which:

FIG. 1A is side view of two stops, which illustrates the context of the invention, FIG. 1B is a front view of the two stops shown in FIG. 1A, FIG. 2A is a side view of two stops, which illustrates an offset, FIG. 2B is a front view of the two stops shown in FIG. 2A, FIG. 3 is a tool for measuring an offset that illustrates an embodiment of the invention, FIG. 4 is a sectional view of the tool shown in FIG. 3, FIG. 5 is a perspective view of a sliding rule of the tool illustrated in FIG. 3, FIG. 6 is a perspective view of a body of the tool illustrated in FIG. 3, FIG. 7 is a side view of two stops and a tool for measuring an offset during a first measurement, and FIG. 8 is a side view of the two stops and the tool for measuring an offset, shown in FIG. 7 during a second measurement.

DETAILED DESCRIPTION

In FIGS. 3, 4, 7 and 8, item 22 represents a tool for controlling an offset between a first stop 24 and a second stop 26. The first and second stops 24 and 26 are approximately aligned in a Y-direction of offset.

According to a configuration, the first stop 24 is integral with a support 28 connected to a frame of an aircraft and the second stop 26 is integral with a support 30 connected to a door hinged relative to the frame.

The first stop 24 and the second stop 26 comprise a first contact surface 24S and a second contact surface 26S, respectively, configured to be in contact against one other when the door is in the closed position.

The first and second contact surfaces 24S and 26S are substantially planar and their contact plane is referred to as reference plane P. The reference plane P is substantially perpendicular to the Y-direction of offset.

According to an embodiment, the first contact surface 24S is elongated in shape. Thus, the first contact surface 24S is delimited by a first edge 32.1 and a second edge 32.2 which are symmetrical in relation to a first central axis X.

According to this configuration, a Z-direction of offset is parallel to the plane P and perpendicular to the first central axis X.

According to an embodiment, the second stop 26 is a cylindrical pellet and comprises a cylindrical periphery 34. The second contact surface 26S is disc-shaped.

In the Z-direction of offset, the second stop 26 is delimited by a first edge 36.1 and a second edge 36.2. In the case of a second stop 24 in the shape of a cylindrical pellet, the first and second edges 36.1 and 36.2 are circular arcs.

Regardless of the shape of the first and second contact surfaces 24S and 26S of the stops 24 and 26, in a first Z-direction of offset, the first stop 24 comprises a first edge 32.1 and a second edge 32.2 arranged on either side of a first central axis X and the second stop 26 comprises a first edge 36.1 and a second edge 36.2 arranged on either side of a second central axis X'.

The first and second edges 36.1 and 36.2 are offset in relation to the first and second edges 32.1 and 32.2, respectively, in the Y-direction of offset perpendicular to the Z-direction of offset.

The distance between the first and second central axes X and X' corresponds to the offset E.

This offset E must be less than or equal to a tolerance value. In the case of an aircraft door, the tolerance value is +/−1 mm.

As illustrated in FIG. 3, the tool 22 comprises a body 38, a sliding rule 40, and a sliding connection 42 connecting the body 38 and the sliding rule 40. The sliding connection 42 is configured to allow the sliding rule 40 to move in a longitudinal direction 44.

According to an embodiment illustrated in FIG. 5, the sliding rule 40 has a constant rectangular cross section in a plane perpendicular to the longitudinal direction 44. Thus, the sliding rule 40 comprises a first face 46, a second face 48 parallel to the first face 46 and two edges 50 connecting the first and second faces 46 and 48. The sliding rule 40 extends from a first end 52 to a second end 54.

The first end 52 is configured to abut against one of the two stops 24 or 26. Advantageously, the first end 52 has a pointed shape to obtain a point contact or near a point contact.

Preferably, the second end 54 of the sliding rule 40 includes a head 56 to handle (pull or push) the sliding rule 40. According to an embodiment, the head 56 has a cross section larger than the rest of the sliding rule 40 to provide a bearing surface 58 configured to be handled by a finger of an operator.

Advantageously, the first face 46 of the sliding rule 40 comprises graduations 60.

According to an embodiment visible in FIG. 6, the body 38 comprises a guide 62 configured to receive the sliding rule 40 and to allow it to slide in the longitudinal direction 44 and an extension 64 which has an end 66 configured to abut against one of the two stops 24 or 26.

The guide 62 and the extension 64 are offset in a transversal direction perpendicular to the longitudinal direction 44 by a distance that approximately corresponds to the offset between the first edge 32.1 and the first edge 36.1 or the second edge 32.2 and the second edge 36.2. For the remainder of the description, a measuring plane is parallel to the longitudinal and transversal directions.

According to an embodiment, the guide 62 comprises a U-shaped groove 68 and 70 flanges arranged on each side of the groove 68 and oriented towards one another so as to partially close the groove 68. The groove 68 and the flanges 70 define a slot with a rectangular cross section equal to an operational clearance near that of the sliding rule 40.

Advantageously, the operational clearance between the guide 62 and the sliding rule 40 allows the sliding rule 40 to be maintained stationary relative to the guide 62 if the sliding rule 40 is not handled.

According to another feature, at least one of the flanges 70 comprises at least one mark 72 that cooperates with graduations 60 of the sliding rule 40. For this purpose, the sliding rule 40 is inserted into the guide 62 so that the first face 46 of the sliding rule 40 bearing the graduations 60 is oriented toward the flanges 70 in order to be visible. Preferably, one of the flanges 70 comprises a plurality of marks 72 that forms a vernier with the graduations 60.

According to an embodiment, the guide 62 is parallelepiped. Preferably, the extension 64 is positioned offset in the longitudinal direction 44 and bears against the face of the guide 62 at which point the groove 68 opens.

Preferably, the end 66 of the extension 64 has a shape configured to cooperate with the shape of one of the stops. According to a configuration, the end 66 of extension 64 comprises a notch 74 in the shape of a circular arc whose diameter is equal to the diameter of the cylindrical periphery 34 of the second stop 26. This configuration allows for better positioning of the tool 22 relative to the stops 24 and 26, notably by positioning the tool 22 so that the generatrix of the circular arc 74 is in contact with the cylindrical periphery of the stop 26.

Additionally, the end 52 of the sliding rule 40 and the centre of the circular arc of the notch 74 are positioned in the measuring plane.

According to another feature, the tool 22 comprises a handle 76 connected to the body 38. This handle 76 is of sufficient length to ensure a proper grasp of the tool from an open area, away from the stops 24 and 26.

According to a configuration, the handle 76 is parallel to the transversal direction.

Preferably, the handle 76 is connected to the body 38 so as to render the graduations 60 visible from the end of the handle 76.

Regardless of the variant, the tool 22 comprises a body 38, a sliding rule 40, the body 38 comprising a guide 62 configured to allow the sliding rule 40 to slide in a longitudinal direction 44 and a control system configured to control that the offset is less than a tolerance value. Preferably, the control system is configured to control that the displacement of the sliding rule 40, in relation to the body 38 between two diametrically opposed measurements and positioned parallel to the direction of offset, is less than twice the tolerance value of the offset. According to an embodiment, the body 38 comprises at least a first mark and the sliding rule 40 comprises at least a second mark. According to a configuration, the first and second marks are aligned when the offset is zero and are shifted in the presence of an offset.

Preferably, the control system is configured to measure the displacement of the sliding rule 40 in relation to the body 38 thanks to the graduations 60 and the mark(s) 72 and thus measure the value of the offset.

The offset control process of the stops 24 and 26 and using the tool 22 is as follows:

Firstly, as illustrated in FIG. 7, a first measurement is made of a first offset between the first edge 36.1 and the first edge 32.1 using the tool 22. To do this, the end 66 of the extension 64 of the body 38 is placed against the second stop 26. The tool must be properly oriented so that the longitudinal direction 44 is aligned with the Z-direction of offset. This positioning is facilitated owing to the circular arc-shaped notch 74 provided at the extremity of the end 66 of the extension 64 which cooperates with the cylindrical periphery 34 of the second stop 26. Next, the sliding rule 40 is pushed so that its end 52 is in contact with the first stop 24. Owing to the graduations 60 and the mark(s) 72, it is then possible to read the first measurement that corresponds to the offset between the first edge 36.1 and the first edge 32.1. If necessary, the tool 22 is withdrawn from the stops 24 and 26, taking care not to push or pull the sliding rule 40 to facilitate reading of the first measurement.

Secondly, as illustrated in FIG. 8, a second measurement of a second deviation between the second edge 36.2 and the second edge 32.2 is made by placing the tool 22 in a position diametrically opposite to that occupied during the first measurement.

As previously, the end 66 of the extension 64 of the body 38 is applied against the second stop 26 by ensuring that the tool is properly oriented.

Next, the sliding rule 40 is pushed so that its end 52 is in contact with the first stop 24. Owing to the graduations 60 and the mark(s) 72, it is then possible to read the second measurement that corresponds to the deviation between the second edge 36.2 and the second edge 32.1. If necessary, the tool 22 is withdrawn from the stops 24 and 26, taking care not to push or pull the sliding rule 40 to facilitate the measurement.

Finally, the value of the offset is determined. The value of the offset is equal to the average of the first and second measurements (which also corresponds to half the difference between the first measurement and the second measurement).

According to a simplified procedure, the tool 22 is positioned in a first position. The end 66 of the extension 64 of the body 38 is applied against the second stop 26, then the sliding rule 40 is pushed so that its end 52 is in contact with the first stop 24. A mark straddling the guide 62 and the sliding rule 40 is made.

Next, the tool 22 is positioned in a second position diametrically opposite to the first position, the first and second positions being aligned in the direction of offset. The end 66 of the extension 64 of the body 38 is applied against the second stop 26, then the sliding rule 40 is pushed so that its end 52 is in contact with the first stop 24. Finally, the deviation between the first part of the mark placed on the guide 62 and the second part of the mark placed on the sliding rule 40 is controlled to ensure that it is less than or equal to twice the tolerance value. According to this simplified procedure, the offset is not measured. A control is performed simply to determine if it is less than or equal to the tolerance value.

Alternatively, the deviation between the first part placed on the guide 62 and the second part of the mark placed the sliding rule 40 is measured to determine the offset value. This offset value is equal to half of the deviation between the two parts of the mark.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for controlling an offset between two stops, the tool comprising:
    a body;
    a sliding rule; and
    a system for controlling a displacement of the sliding rule in relation to the body, the sliding rule comprising an end configured to abut against a first stop of the two stops, the body comprising a guide configured to allow the sliding rule to slide in a longitudinal direction and an extension that includes an end configured to abut against a second stop of the two stops, the guide and the extension being offset in relation to one another in a transversal direction perpendicular to the longitudinal direction, wherein the end of the extension comprises a notch in the shape of a circular arc with a diameter equal to the diameter of the second stop in the shape of a cylindrical pellet.

2. The tool according to claim 1, wherein the end of the sliding rule has a pointed shape.

3. The tool according to claim 1, wherein the control system is configured to measure the displacement of the sliding rule in relation to the body.

4. The tool according to claim 3, wherein the control system comprises graduations on the sliding rule and at least one mark on the body configured to cooperate with the graduations of the sliding rule.

5. The tool according to claim 1, wherein the tool comprises a handle connected to the body.

6. A method for controlling an offset between a first stop and a second stop, the first stop comprising a first contact surface delimited in a direction of offset by a first edge and by a second edge, the second stop comprising a second contact surface delimited in the direction of offset by a first edge and by a second edge, the method comprising:

determining a deviation between a first distance in the direction of offset, in a first position, between the first edge of the first stop and the first edge of the second stop and a second distance in the direction of offset, in a second position diametrically opposite to the first position, between the second edge of the first stop and the second edge of the second stop and a step of controlling that the deviation is less than or equal to twice a tolerance value.

7. A method for measuring an offset between a first stop and a second stop, the first stop comprising a first contact surface delimited in a direction of offset by a first edge and by a second edge, the second stop comprising a second contact surface delimited in the direction of offset by a first edge and by a second edge, to the method comprising:

performing a first measurement in the direction of offset, in a first position, between the first edge of the first stop and the first edge of the second stop;

performing a second measurement in the direction of offset, in a second position diametrically opposite to the first position, between the second edge of the first stop and the second edge of the second stop;

determining a value of offset that is equal to half the difference between the first measurement and the second measurement.

\* \* \* \* \*